(12) United States Patent
Rayborn

(10) Patent No.: US 7,060,660 B2
(45) Date of Patent: *Jun. 13, 2006

(54) DRILLING FLUID ADDITIVE SYSTEM CONTAINING TALC AND GRAPHITE

(75) Inventor: Jerry Rayborn, Franklinton, LA (US)

(73) Assignee: Alpine Mud Products Corp, Belle Chasse, LA (US)

( * ) Notice: Subject to any disclaimer, the term of this patent is extended or adjusted under 35 U.S.C. 154(b) by 438 days.

This patent is subject to a terminal disclaimer.

(21) Appl. No.: 10/667,415

(22) Filed: Sep. 23, 2003

(65) Prior Publication Data

US 2004/0058826 A1 Mar. 25, 2004

Related U.S. Application Data

(63) Continuation-in-part of application No. 10/196,265, filed on Jul. 17, 2002, now Pat. No. 6,734,145.

(51) Int. Cl.
*C09K 8/04* (2006.01)

(52) U.S. Cl. ............... 507/140; 507/103; 507/112; 507/136; 507/107; 507/108; 507/118; 507/125; 507/120

(58) Field of Classification Search ............. 507/140, 507/103, 112, 136, 107, 108, 118, 125, 120
See application file for complete search history.

(56) References Cited

U.S. PATENT DOCUMENTS

| | | | |
|---|---|---|---|
| 4,083,407 A | 4/1978 | Griffin, Jr. et al. | |
| 4,088,583 A | 5/1978 | Pyle et al. | |
| 5,114,597 A | 5/1992 | Rayborn et al. | |
| 5,114,598 A | 5/1992 | Rayborn et al. | |
| 5,226,961 A | 7/1993 | Nahm et al. | |
| 5,401,719 A | 3/1995 | DeBeer | |
| 5,792,727 A | 8/1998 | Jacobs | |
| 5,826,669 A | 10/1998 | Zaleski et al. | |
| 5,891,832 A | 4/1999 | Rayborn, Sr. et al. | |
| 5,898,022 A | 4/1999 | Maples | |
| 5,942,467 A | 8/1999 | Rayborn, Sr. et al. | |
| 5,985,431 A | 11/1999 | Oosedo et al. | |
| 6,059,034 A * | 5/2000 | Rickards et al. | 166/280.2 |
| 6,152,227 A | 11/2000 | Lawson et al. | |
| 6,335,309 B1 | 1/2002 | Takagi et al. | |
| 6,398,224 B1 | 6/2002 | Erb et al. | |
| 6,605,570 B1 | 8/2003 | Miller et al. | |
| 6,734,145 B1 * | 5/2004 | Rayborn | 504/140 |
| 6,737,384 B1 * | 5/2004 | Rayborn | 507/139 |

* cited by examiner

*Primary Examiner*—Philip Tucker
(74) *Attorney, Agent, or Firm*—Dan M. De La Rosa

(57) ABSTRACT

A drilling fluid additive system is provided wherein the system comprises: a drilling fluid additive comprising talc, graphite and at least one carrier such as a glycol; and hydrophilic clay, a pH controller, a fluid loss controller, and at least one dispersant.

34 Claims, 2 Drawing Sheets

DRILLING FLUID ADDITIVE SYSTEM CONTAINING TALC AND GRAPHITE

RELATED APPLICATION

This application is a continuation-in-part of U.S. application Ser. No. 10/196,265, entitled "Drilling Fluid Additive System Containing Talc & Carrier" which was filed on Jul. 17, 2002, now U.S. Pat. No. 6,734,145.

BACKGROUND OF THE INVENTION

1. Field of the Invention

The present invention provides a drilling fluid additive system comprising: a drilling fluid additive comprising talc, graphite and at least one carrier; and hydrophilic clay, a pH controller, a fluid loss controller, and at least one dispersant. More specifically, the present invention relates to a drilling fluid additive system manufactured by a method comprising: admixing talc, graphite and at least one carrier to form a drilling fluid additive mixture; and further admixing hydrophilic clay, a pH controller, a fluid loss controller, and at least one dispersant to the drilling fluid additive mixture.

2. Description of the Related Art

New technology in drilling for oil and gas now includes horizontal drilling. The horizontal drilling concept exposes more surface area of the producing zone than the conventional vertical drilling operations. For example, if a producing zone is fifty feet in thickness and a vertical well is drilled through such a zone, then only fifty feet of the producing zone will be exposed for production. In contrast, a horizontally drilled well may penetrate the producing sand or zone by one thousand feet or more. The amount or volume of oil or gas production is directly proportional to the horizontal penetration in feet into the producing sand or zone. In horizontal or directional drilling where the drill pipe must bend in order to achieve the desired penetration into the producing zone, friction becomes a major problem. The primary source of friction is directly related to the adhesion of the drilling assembly to the wall cake which lines the drilled well bore. The capillary attractive forces generated by the adhesion of the drilling assembly to the wall cake are directly proportional to the amount or footage of the drilling assembly exposed to the surface of the wall cake.

In horizontal or directional wells, many methods have been used in order to reduce friction between the drilling assembly and the wall cake. One such method would be to add a liquid lubricant to the drilling fluid in order to reduce the coefficient of friction of the drilling fluid. These liquid lubricants include oils, such as hydrocarbon based oils, vegetable oils, glycols, etc. These liquid lubricants will usually reduce the coefficient of friction of the drilling fluid resulting in a reduction of friction between the drilling assembly and the wall cake of the well bore.

When the liquid lubricant is added to the drilling fluid, it has several options as to how it will react. One option is that the lubricant remains isolated and does not mix well with the drilling fluid. A second option is that the lubricant emulsifies with the water in the drilling fluid to form an oil-in-water emulsion. Still another option is the oil attaching itself to the commercial solids in the drilling fluid or to the drilled cuttings or drilled solids. In certain circumstances, some of the liquid lubricant might be deposited or smeared onto the wall cake of the well bore. The ideal scenario would be to have all of the liquid lubricant deposited on the wall cake.

Those experienced in drilling fluid engineering know that a thin, tough, pliable, and lubricious wall cake is most desirable. The integrity of a wall cake is determined by several factors. The thickness of a wall cake is directly proportional to the amount of liquid leaving the drilling fluid, and being forced into the wall of the well bore by hydrostatic pressure. The thickness of the wall cake is also determined by the type and particle size of the solids in the drilling fluid. Particle Size Distribution, or PSD is important to the wall cake integrity. Experts in drilling fluids also know that materials such as bentonite clay, starches, lignites and polymers are all used to build acceptable wall cakes. It is known in the prior art that various food grade vegetable oils are acceptable lubricants when used alone in water-based drilling fluids. It is also known in the prior art that round co-polymer beads when used alone in water-based drilling fluids function as a good friction reducer. However, much more is required to improve the wall cake integrity and lubricity of most well bores.

Furthermore, the solids control equipment used on the drilling rigs today is far superior as to what was used 15 to 20 years ago. In the past, drilling rig shale shakers would probably be limited to screen sizes of about 20–40 mesh on the shakers. These coarser mesh screens would allow pieces of shale and the drilled formation to pass through the shaker screens back into the drilling fluid and then recirculated back down the well bore. As these larger than colloidal size particles make their way back up the well bore to the surface, the action of the drilling assembly rotating within the well bore forces these larger particles into the surface of the well bore. For example: a 20×20 mesh shaker screen would allow a drilled cutting sized at 863 microns or 0.0340 inches to pass through it and then the cutting would be returned to the well bore and some of these 863 micron cuttings would eventually be embedded into the wall cake. This would give the wall cake surface a texture resembling that of coarse sandpaper. These larger particles would allow the drilling fluid to channel and pass between the drilling assembly and the wall cake thereby reducing the negative effect of the capillary attractive forces generated by the close contact of the drilling assembly with the wall cake. The instances of the drilling assembly becoming stuck to the wall cake when less efficient solids control equipment, such as shale shakers, that were used, was much less than it is today. The more efficient shale shakers today are a great improvement for the drilling fluids but the instances of sticking the drilling assembly are higher. The reason for a higher rate of stuck drilling assemblies today could be blamed on cleaning the drilling fluid to efficiently. Today many drilling rigs utilize cascading shale shakers, which eventually pass the drilling fluid through 200 mesh or 74 micron screens. This is very positive for controlling the percentage of drilled solids in the drilling fluid but it also affects the texture, the thickness and the surface of the wall cake. The finer the solids on the surface of the wall cake are, the greater the capillary attractive forces will be between the drilling assembly and the wall cake.

The present invention provides a method of enhancing the surface and the thickness of the wall cake. In order to accomplish this, the invention provides a method, which adds something to improve the texture of the surface of the wall cake, and then adds something to prevent large amounts of water from leaving the drilling fluid then passing through the wall cake into the formation. The present invention also provides a carrier for the colloidal solids and beads, which also acts as a lubricant for the drilling fluid. The present invention further provides a process that reduces the effect of capillary attractive forces between the drilling assembly and the wall cake, thereby reducing the tendency of the drilling assembly to become stuck. In high angle directional wells where down hole motors are used to rotate the drill bit and the drill pipe remains stationary, it is important that the drilling assembly can "slide" as the drilling bit cuts more holes. The present invention improves the ability to "slide" while drilling as stated above.

The drilling fluid additive of the present invention has the following functions: borehole stability; shields water sensitive shales; is a superior pore throat sealer; seals depleted sands and microfractures; and lowers HTHP/dynamic filtrate. In addition, the additive of the present invention also provides the following benefits: low spurt loss in sands; reduces hole reaming and fill; and provides near gauge hole. The drilling fluid additive of the present invention also functions as a partial plugging agent. For purposes of this invention, the term "partial plugging agent (PPG)" is defined as a product that wholly or partially plugs up a hole.

SUMMARY OF THE INVENTION

In one embodiment, the present invention relates to a drilling fluid additive system comprising: a drilling fluid additive comprising talc, graphite and at least one carrier; and hydrophilic clay, a pH controller, a fluid loss controller, and at least one dispersant.

In another embodiment, the drilling fluid additive system further comprises uintaite. In still another embodiment, the carrier comprises polypropylene glycol. In yet another embodiment, the carrier is selected from a group consisting of oils, esters, glycols, cellulose, olefins and mixtures thereof.

In still yet another embodiment, the talc comprises from about 1% to about 20% of the additive, the graphite comprises from about 1% to about 30% of the additive, the carrier comprises from about 50% to about 90% of the additive and the uintaite comprises from about 1% to about 40% of the additive.

In a further embodiment, the carrier is selected from a group consisting of polypropylene glycol, polyethoxylated glycol, polybutylene glycol, polyethylene glycol, propylene glycol, polyester polyol-poly(oxyethylene-oxy)propylene glycol, polyoxyalkylene glycol ethers and mixtures thereof. In still a further embodiment, the uintaite is treated with a second carrier in order to render the normally hydrophobic uintiate (Gilsonite™) hydrophilic; the second carrier is selected from a group consisting of oils, esters, glycols, cellulose, olefins and mixtures thereof.

In yet a further embodiment, the system further comprises a weighting agent, the weighting agent is selected from a group consisting of barium sulfate (barite), calcium carbonate, hematite, and salts. In still yet a further embodiment, the pH controller is selected from a group consisting of caustic soda, potassium hydroxide, lime and sodium hydroxide. In a further embodiment, the fluid loss controller is selected from a group consisting of lignites, polyacrylamide and graphite uintaite (Gisonite™) glycol dispersions. In still a further embodiment, the hydrophilic clay is selected from a group consisting of bentonite and/or kaolin clay. In yet a further embodiment, the dispersant is selected from a group consisting of lignite, lignosulfonate and tannin.

In still yet a further embodiment, the system further comprises a chemical inhibitor, said chemical inhibitor is selected from a group consisting of gypsum, lime, potassium chloride, potassium hydroxide, magnesium sulfate and calcium sulfate. In another further embodiment, the system further comprises polymer beads.

In another embodiment, the present invention provides a drilling fluid additive system manufactured by a method comprising: admixing talc, graphite and at least one carrier to form a drilling fluid additive mixture; and further admixing hydrophilic clay, a pH controller, a fluid loss controller, and at least one dispersant to the drilling fluid additive mixture.

In still another embodiment, the carrier is first admixed with the talc and then the graphite is admixed to form the drilling fluid additive mixture. In yet another embodiment, the system further comprises admixing a uintaite with the drilling fluid additive mixture. In still yet another embodiment, the carrier is selected from a group consisting of oils, esters, glycols, cellulose, olefins and mixtures thereof In a further embodiment, the uintaite is pre-treated with a second carrier to render the uintaite hydrophilic, prior to the uintaite being admixed to the drilling fluid additive mixture.

In still a further embodiment, the second carrier is selected from a group consisting of oils, esters, glycols, cellulose, olefins and mixtures thereof. In yet a further embodiment, the system further comprises admixing a weighting agent, the weighting agent is selected from a group consisting of barium sulfate (barite), calcium carbonate, hematite, and salts. In still yet a further embodiment, the further comprises admixing a chemical inhibitor, the chemical inhibitor is selected from a group consisting of gypsum, lime, potassium chloride, potassium hydroxide, magnesium sulfate and calcium sulfate. In another further embodiment, the pH controller is selected from a group consisting of caustic acid, potassium hydroxide, lime and sodium hydroxide.

In still another further embodiment, the fluid loss controller is selected from a group consisting of lignites, polyacrylamides and graphite, uintaite (Gilsonite™) glycol dispersions. In yet another further embodiment, the dispersant is selected from a group consisting of lignite, lignosulfonate and tannin.

In still yet another further embodiment, the hydrophilic clay is selected from a group consisting of bentonite and kaolin clay. In another embodiment, the system further comprises admixing polymer beads to said drilling fluid additive mixture.

In a further embodiment, the resent invention also relates to a method of manufacturing a drilling fluid additive system, said method comprising: admixing talc with at least one carrier; admixing graphite to the talc/carrier mixture to thereby form a drilling fluid additive mixture; and further admixing hydrophilic clay, a pH controller, a fluid loss controller, and at least one dispersant to the drilling fluid additive mixture. In one embodiment, the carrier surface coats the talc and graphite.

In still another embodiment, the method further comprises admixing uintaite with the drilling fluid additive mixture. In yet another embodiment, the uintaite is pretreated with a second carrier to render the uintaite hydrophilic prior to admixing the uintaite to the drilling fluid additive mixture. In still yet another embodiment, the method further comprises admixing a weighting agent, the weighting agent is selected from a group consisting of barium sulfate (barite), calcium carbonate, hematite, and salts. In a further embodiment, the method further comprises admixing a chemical inhibitor, the chemical inhibitor is selected from a group consisting of gypsum, lime, potassium chloride, potassium hydroxide, magnesium sulfate and calcium sulfate. In a further embodiment, the method further comprises admixing polymer beads to the drilling fluid additive mixture.

Graphite:

Graphite has been used for many years as a lubricant. The lubricating mechanism of graphite is thought to be mechanical in nature and results from the sliding of one graphite particle over another graphite particle. Graphite may be used as a dry lubricant or may be dispersed in lubricating oil. Graphite particles may also be incorporated into a grease product for improved lubrication. Because graphite has the reputation for being a superior lubricant, various grades of graphite were tested in various water-based drilling fluid. It was concluded that dry graphite added to a water-based drilling fluid reduced the friction very little. One of the objectives of the present invention is to improve the lubricating qualities of graphite in a water-based drilling mud. Since all the tests using dry graphite proved unsuccessful, it was determined that the surface of the graphite was hydrophobic or organophilic. The process of the present invention allows the graphite to be surface coated with the glycol carrier rendering the surface of the graphite particles hydrophilic.

Another problem with adding untreated graphite to a water-based drilling fluid, which contains a percentage of oil (either animal, vegetable or hydrocarbon oil), is that the graphite has a propensity to migrate to the oil and form an oil-wet slurry. The slurry is screened out over the fine mesh rig shaker and the slurry containing the graphite is lost. Another object of the present invention is to prevent the graphite from migrating to the oil and being discarded during the screening process. The carrier coating process of the present invention allows the coated graphite particles to remain dispersed throughout the mud system.

Another object of the present invention was to successfully suspend the graphite in a dispersion with a glycol carrier so that the carrier would not settle to the bottom of the container and be unusable. The carrier-coated graphite of the present invention acts as an excellent fluid loss additive thereby improving the filter cake integrity of the water-based mud. The hydrophilic, glycol-coated graphite particles would seem to be ideal particle pluggers and it is believed that the graphite particles or platelets would stack one on top of the other. In a further embodiment and in order to create a suspension of graphite in a glycol carrier with an extended shelf life, it was determined that additional solids having a specific gravity of approximately 1 to 1.2 might improve the suspension. In another embodiment, the present invention adds uintaite to improve the suspension.

BRIEF DESCRIPTION OF THE DRAWINGS

The accompanying charts are included to provide a further understanding of the present invention. These charts are incorporated in and constitute a part of this specification, illustrate one or more embodiments of the present invention, and together with the description, serve to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The present invention relates to a uintaite-based (Gilsonite™-based) dispersion fluid that is environmentally safe; passes LC50; and has no sheen. For purposes of this invention, "LC50" is defined as an acceptable environmental guideline. The term "sheen" is defined as an oil film or coating. The drilling fluid additive of the present invention has a 1.08 specific gravity and is temperature stable.

The present invention provides a process that includes selecting specific materials having different particle sizes and then pre-wetting each particle with an environmentally acceptable carrier prior to adding these particles to the water-based drilling fluid. This process produces much improved wall cake integrity and lubricity. The present invention also teaches that various glycols are excellent carriers for various solid friction reducers and wall cake enhancers. The present invention has also discovered that pre-wetting the graphite with a carrier such as glycol renders the graphite hydrophilic, which improves the lubrication or friction reducing capacity of the graphite as well as the particle plugging ability of the graphite. The other criterion is that the products and its components have to be environmentally friendly.

Figure 1:
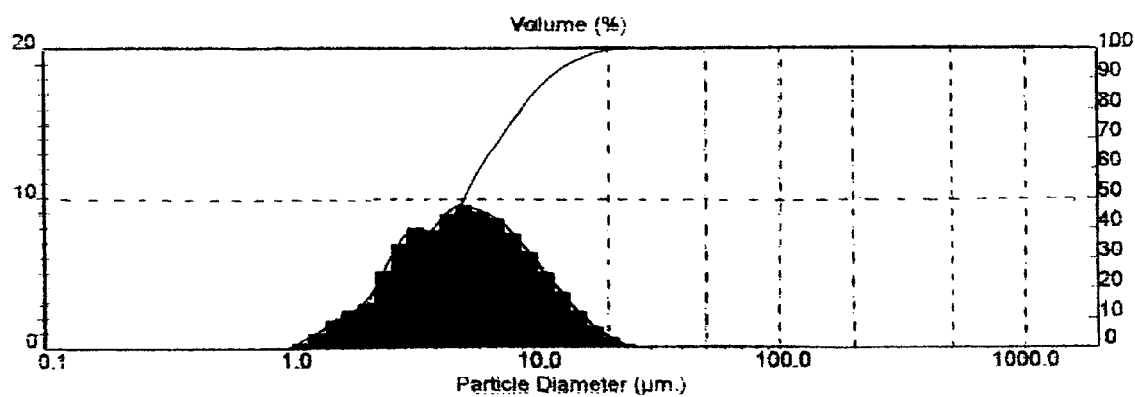
FIG. 1 is a graph representing talc particle size versus volume in percent.

Talc & Carrier:

In accordance with the manufacturing process of the present invention, talc powder is sheared with an environmentally friendly carrier such as glycol. The shearing should continue until each or most of the organophilic or hydrophobic talc particles are coated with the glycol. In one embodiment, the talc powder most preferred would be one with a particle size from about 1 micron to about 20 microns and one which would produce a bell shaped curve having the majority of the particles in the 2 micron to 8 micron size, as shown in FIG. 1.

The polymeric beads of the present invention should be a solid particle, preferably round and have a specific gravity close to 1.0 and have a size from about 100 microns to about 900 microns. The beads must also have an affinity for oils, esters, olefins and glycols, etc. It was determined that a copolymer bead manufactured by Dow Chemical comprised of styrene and divinylbenzene would be acceptable.

The colloidal solids of the present invention should have a size range of 2–10 microns since tests have proven that this particle size will bridge sandstone having a permeability of 200 md. The solids must also have an affinity for oils, esters, olefins and glycols, etc. In one embodiment, the solids are talc. The talc of the present invention also functions as an excellent suspending agent in both oils and glycols. FIG. 1 depicts a graphical representation of the particle size of talc and Table 1, as set forth below, represents the result statistics for the particle size for talc:

TABLE 1

Particle Size Statistics For Talc
Dist. Type: Vol Concentration = 0.0136% Vol
Density = 2.650 g/cub. cm Spec. SA = 0.5176 sq. m/g
Mean Diameters: D (v, 0.1) = 2.40 um
D (v, 0.5) = 5.28 um D (v, 0.9) = 11.68 um
D [4, 3] = 6.30 um D [3, 2] = 4.37 um
Span = 1.760E+00 Uniformity = 5.495E−01

| Size Low (um) | In % | Size High (um) | Under % |
|---|---|---|---|
| 0.31 | 0.00 | 0.36 | 0.00 |
| 0.36 | 0.00 | 0.42 | 0.00 |
| 0.42 | 0.00 | 0.49 | 0.00 |
| 0.49 | 0.00 | 0.58 | 0.00 |
| 0.58 | 0.00 | 0.67 | 0.00 |
| 0.67 | 0.00 | 0.78 | 0.00 |
| 0.78 | 0.00 | 0.91 | 0.00 |
| 0.91 | 0.02 | 1.06 | 0.02 |
| 1.06 | 0.32 | 1.24 | 0.35 |
| 1.24 | 0.94 | 1.44 | 1.29 |
| 1.44 | 1.83 | 1.68 | 3.12 |
| 1.68 | 2.51 | 1.95 | 5.62 |
| 1.95 | 2.94 | 2.28 | 8.57 |
| 2.28 | 5.05 | 2.65 | 13.62 |
| 2.65 | 6.89 | 3.09 | 20.51 |
| 3.09 | 7.96 | 3.60 | 28.47 |
| 3.60 | 7.81 | 4.19 | 36.29 |
| 4.19 | 8.89 | 4.88 | 45.18 |
| 4.88 | 9.49 | 5.69 | 54.67 |
| 5.69 | 9.05 | 6.63 | 63.72 |
| 6.63 | 8.60 | 7.72 | 72.33 |
| 7.72 | 7.61 | 9.00 | 79.94 |
| 9.00 | 6.35 | 10.48 | 86.29 |
| 10.48 | 5.02 | 12.21 | 91.31 |
| 12.21 | 3.70 | 14.22 | 95.01 |
| 14.22 | 2.47 | 16.57 | 98.95 |
| 16.57 | 1.46 | 19.31 | 99.68 |
| 19.31 | 0.73 | 22.49 | 100.00 |
| 22.49 | 0.27 | 26.20 | 100.00 |
| 26.20 | 0.05 | 30.53 | 100.00 |
| 30.53 | 0.00 | 35.56 | 100.00 |
| 35.56 | 0.00 | 41.43 | 100.00 |
| 41.43 | 0.00 | 48.27 | 100.00 |
| 48.27 | 0.00 | 56.23 | 100.00 |
| 56.23 | 0.00 | 65.51 | 100.00 |
| 65.51 | 0.00 | 76.32 | 100.00 |
| 76.32 | 0.00 | 88.91 | 100.00 |
| 88.91 | 0.00 | 103.58 | 100.00 |
| 103.58 | 0.00 | 120.67 | 100.00 |
| 120.67 | 0.00 | 140.58 | 100.00 |
| 140.58 | 0.00 | 163.77 | 100.00 |
| 163.77 | 0.00 | 190.80 | 100.00 |
| 190.80 | 0.00 | 222.28 | 100.00 |
| 222.28 | 0.00 | 258.95 | 100.00 |
| 258.95 | 0.00 | 301.68 | 100.00 |

The carrier of the present invention may be selected from different oils, olefins, esters, fatty acids, cellulose and glycols. In another embodiment, the carrier may be synthetic oils, diesel oils, rice oils, cottonseed oils, corn oils, safalour oils, linseed oils, coconut oils, vegetable oils, mineral oils, animal oils and paraffin oils. In still another embodiment, the carrier is soybean oil. The oil coating on the hydrophobic talc particles enhances the plugging action of the talc across or into micro fractures in sands, shale and other substances down hole.

In a further embodiment, the present invention relates to a method of manufacturing a drilling fluid additive whereby talc and copolymer beads are added to soybean oil and mixed or sheared until each particle of talc and each copolymer bead is oil wet. A first sample was produced by addition of 350 grams of soybean oil with 5 grams of talc and 100 grams of polymer beads to the oil, and then mixing all the components for 10 minutes using a waring blender. After blending, the mixture was placed in a beaker for observation. The mixture appeared homogeneous and initially resembled buttermilk. After 5 minutes, the beads began to settle. After one hour, all the beads settled to the bottom of the beaker and some of the oil began separating from the mixture and clear oil was present at the upper portion of the beaker. After sitting overnight (10 hours later), the upper portion of the beaker was clear oil and the bottom portion was the talc, beads and oil. Pouring the clear oil off exposed that the beads had settled and packed tightly preventing the beads from pouring out of the beaker. This sample could not be placed in a drum or tank for shipping because the beads would settle and plug the drum or tank.

Figure 2:
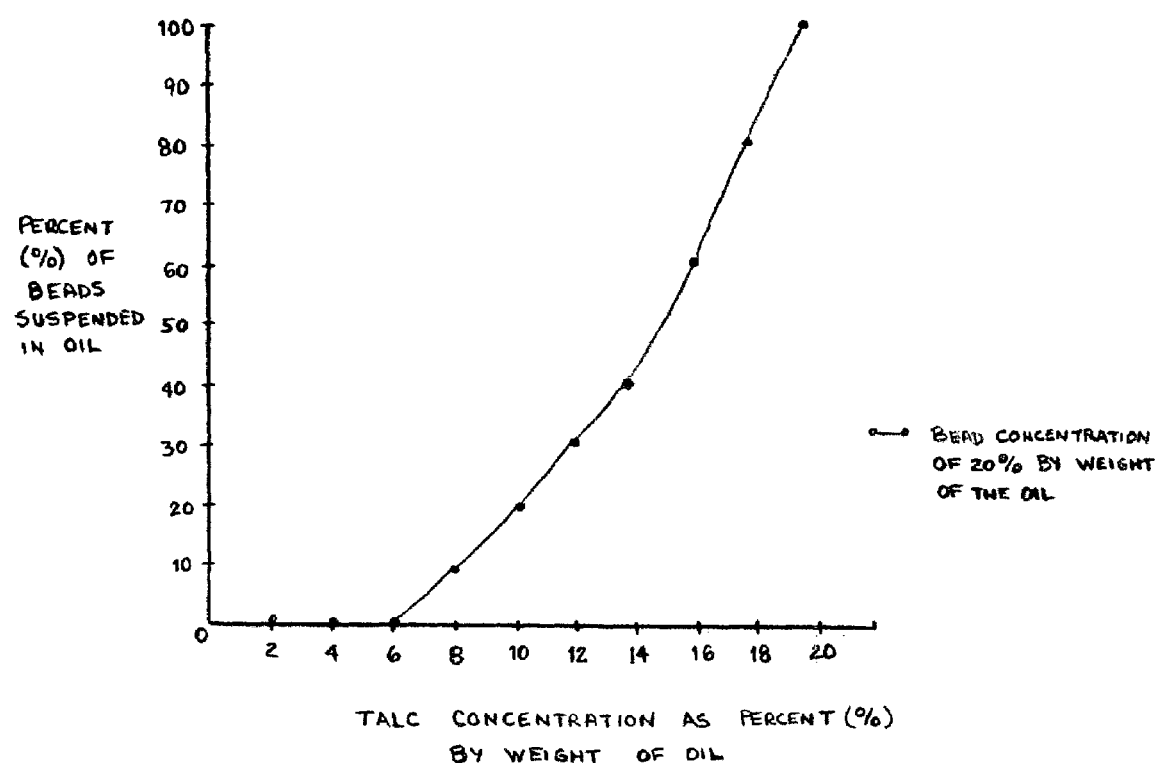
FIG. 2 is a graph representing the percent of beads suspended in oil versus the talc concentration as percent by weight of oil.

A second sample was produced by adding talc to the oil and eliminating the beads initially. It was discovered that the oil accepted approximately 40% by weight of talc. After sitting overnight, there was no separation between the talc and the oil. At that point, small additions of beads were added to the above mixture. The addition of 2% by weight of beads to the talc/oil mixture was encouraging. The beads settled slightly but did not pack off. As the concentration of the beads was increased in the mixture, it was discovered that the beads remained suspended in the mixture. FIG. 2 depicts graphical representations of the talc concentration as percent (%) by weight of oil versus the percent (%) of beads suspended in oil. FIG. 2 illustrates that as the talc concentration as a percent (%) by weight of the oil increases, the suspension qualities of the liquid oil increases. As FIG. 2 illustrates, the talc concentration of 20 percent by weight of the liquid oil suspends 100 percent of the copolymer beads.

The second sample was then heated to 150 degrees Fahrenheit for 24 hours and the copolymer beads remained suspended. The mixture was then cooled to 35 degrees Fahrenheit for 24 hours and the copolymer beads remained suspended. It was also discovered that the optimum concentration of the beads was from about 20 percent to about 30 percent by weight of the oil, and the concentration of the talc should be around 20 percent by weight of oil. Although this sample appears to be the best, the concentration may vary.

The specific examples throughout the specification will enable the present invention to be better understood. However, they are merely given by way of guidance and do not imply any limitations. Example 1 conducted tests on a 9.9 pounds per gallon (ppg) water-based drilling fluid and Example 2 conducted tests on a 16.9 pounds per gallon (ppg) water-based drilling fluid. Example 3 conducted tests on the reduction of capillary forces in both the 9.9 ppg drilling fluid of Example 1 and the 16.9 ppg drilling fluid of Example 2.

EXAMPLE 1

Test 1: Rheology & HPHT Results

In Example 1, a 9.9 pound per gallon water-based drilling fluid was tested for the (a) the compatibility of the drilling fluid-such as rheology; and the yield point and gels in particular; (b) the high pressure high temp fluid loss-HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a waring blender. In Test 1 & Table 2, the following rheology and HPHT results were noted:

TABLE 2

Rheology & HPHT Results

|  | BASE | BASE & 2% TALC MIXTURE | % REDUCTION |
|---|---|---|---|
| Density | 9.9 | | |
| PH Meter | 10.3 | | |
| 600 rpm | 19 | 22 | |
| 300 rpm | 11 | 13 | |
| 200 rpm | 8 | 10 | |
| 100 rpm | 5 | 6 | |
| 6 rpm | 2 | 1 | |
| 3 rpm | 2 | 1 | |
| PV @ 120 F. | 8 | 9 | |
| YP | 3 | 4 | |
| Gels 10 sec/10 min | 2/13 | 1/17 | |
| HPHT @ 200 Deg F./ml | 12.0 | 8.0 | 33% |
| Cake Wt./g | 5.9 | 5.4 | 8% |
| Cake Thickness/inch | 3/32 | 2/32 | 33% |
| MBT/pbb | 30 | | |
| Solid/Oil/Water | 10/00/90 | | |

The results of Example 1, Test 1 indicate the following: the talc, bead and oil mixture was very compatible with the mud rheology with only slight increases in yield point and gels. The HPHT fluid loss was reduced from 12.0 to 8.0; a 33% reduction, which is excellent. The cake in weight in grams was reduced from 5.9 grams to 5.4 grams, an 8% reduction. The cake thickness in inches was reduced from 3/32 to 2/32, a 33% reduction, which is also excellent.

EXAMPLE 1

Test 2: Dynamic Filtration

In Example 1, Test 2, the following dynamic filtration criteria were tested: (a) Fluid loss versus time; (b) Filter cake wt/gram; and (c) Filter cake thickness in inches. The dynamic filtration data of Example 1, Test 2 is set forth in Table 3 below:

TABLE 3

DYNAMIC FILTRATION
5 Darcy, 50 Micron Filter Media
200 Degrees F., 600 rpm @ 1000 PSI for 60 Minutes

| | Fluid Loss (ml) | | |
|---|---|---|---|
| TIME (Minutes) | BASE | BASE & 2% TALC MIXTURE | % REDUCTION |
| Initial Spurt | 1.5 | trace | |
| 15 | 12.6 | 5.8 | |
| 30 | 17.0 | 10.0 | |
| 45 | 21.2 | 14.0 | |
| 60 | 24.0 | 16.8 | 30% |
| Cake Wt/g | 10.7 | 5.8 | 46% |
| Cake Thickness/Inch | 3/32 | 2/32 | 33% |

The results of Example 1, Test 2 are as follows: after 60 minutes, the dynamic fluid loss was reduced from 24.0 ml to 16.8 ml, a 30% reduction, which is excellent. The cake weight in grams was reduced from 10.7 grams to 5.8 grams, a 46% reduction, which is also excellent. The cake thickness was reduced from 3/32 to 2/32, a 33% reduction, which is excellent.

EXAMPLE 1

Test 3: Lubricity Test

Table 4 below shows the test results of the lubricity of the additive as torque is applied.

TABLE 4

LUBRICITY TEST @ 60 rpms
Co-efficient of Friction of Water (0.33–0.36) = 0.33; i.e. reading at 150 inch pounds is 33

| | | Lubricity Reading (electric current required to sustain 60 rpm at applied torque) | |
|---|---|---|---|
| Applied Torque/ Inch Pounds | BASE | BASE & 2% TALC MIXTURE | % REDUCTION |
| 100 | 10 | 11 | |
| 150 | 16 | 16 | |
| 200 | 21 | 21 | |
| 300 | 31 | 28 | |
| 400 | 44 | 37 | |
| 500 | 66 | 50 | |
| 600 | 80 | 65 | 19% |

The lubricity results of Example 1, Test 3 indicate an improvement in lubrication was about 19% at the 600 reading on the lubricity tester.

EXAMPLE 1

Test 4: Texture of Dynamic Filter Cake Surfaces

The texture of the filter cake surfaces and the surfaces of the base mud were also tested. The results were as follows: the texture of the surface of the base mud was extremely smooth and shinny. The texture of the Dynamic Filter Cake Surface of the base mud treated with 2% by volume of the talc, bead and oil mixture was shinny and the copolymer beads could be seen impregnated in the cake as well as protruding on the ace of the cake.

EXAMPLE 2

Test 1: Rheology & HPHT Results

In Example 2, a 16.9 pound per gallon water-based drilling fluid was tested for the (a) the compatibility of the drilling fluid-such as rheology; and the yield point and in particular; (b) the high pressure high temp fluid loss-HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a waring blender. In Example 2, Test 1, the following rheology and HPHT results were noted in Table 5 below:

TABLE 5

Rheology & HPHT Results

| | BASE | BASE & 2% TALC MIXTURE | % REDUCTION |
|---|---|---|---|
| Density | 16.9 | | |
| PH Meter | 10.4 | | |

TABLE 5-continued

Rheology & HPHT Results

| | BASE | BASE & 2% TALC MIXTURE | % REDUCTION |
|---|---|---|---|
| 600 rpm | 53 | 56 | |
| 300 rpm | 30 | 32 | |
| 200 rpm | 22 | 25 | |
| 100 rpm | 13 | 15 | |
| 6 rpm | 2 | 3 | |
| 3 rpm | 1 | 2 | |
| PV @ 120 F. | 23 | 24 | |
| YP | 7 | 8 | |
| Gels 10 sec/10 min | 4/19 | 5/27 | |
| HPHT @ 300 Deg F./ml | 15.0 | 13.2 | 12% |
| Cake Wt./g | 27.2 | 18.7 | 31% |
| Cake Thickness/inch | 6/32 | 4/32 | 33% |

The results of Example 2, Test 1 indicate the following: in Test 2, Table 5, the talc, beads and oil mixture was very compatible with the mud rheology with little change points and gel. The HPHT fluid loss was reduced from 15.0 to 13.2, a 12% reduction, which is somewhat less than expected. The cake weight in grams was reduced from 27.2 grams to 18.7 grams, a 31% reduction, which is a very good result. The cake thickness was reduced from 6/32 to 4/32, a 33% reduction.

EXAMPLE 2

Test 2: Dynamic Filtration

In Example 2, Test 2, the following dynamic filtration criteria were tested: (a) Fluid loss versus time; (b) Filter cake wt/gram; and (c) Filter cake thickness in inches. The dynamic filtration data of Example 2, Test 2 is set forth in Table 6 below:

TABLE 6

DYNAMIC FILTRATION
10 Darcy, 35 Micron Filter Media
300 Degrees F., 600 rpm @ 1000 PSI for 60 Minutes

| | Fluid Loss (ml) | | |
|---|---|---|---|
| TIME (Minutes) | BASE | BASE & 2% TALC MIXTURE | % REDUCTION |
| Initial Spurt | 1.0 | 0.5 | |
| 15 | 25.2 | 17.6 | |
| 30 | 38.0 | 25.0 | |
| 45 | 46.0 | 31.4 | |
| 60 | 53.2 | 36.0 | 32% |
| Cake Wt/g | 91 | 62 | 32% |
| Cake Thickness/Inch | 18/32 | 12/32 | 33% |

The results of Example 2, Test 2, Table 6 are as follows: after 60 minutes, the dynamic fluid loss was reduced from 24.0 ml to 16.8 ml, a 32% reduction, which is an excellent result. The cake weight in grams was reduced from 91 grams to 62 grams, a 32% reduction, which is a very good result. The filter cake was reduced from 18/32 to 12/32, a 33% reduction, which is also an excellent result.

EXAMPLE 2

Test 3: Lubricity Test

Table 7 below shows the test results of the lubricity of the additive as torque is applied.

TABLE 7

LUBRICITY TEST @ 60 rpms
Co-efficient of Friction of Water (0.33–0.36) = 0.33;
i.e. reading at 150 inch pounds is 33

| | Lubricity Reading (electric current required to sustain 60 rpm at applied torque) | | |
|---|---|---|---|
| Applied Torque/ Inch Pounds | BASE | BASE & 2% TALC MIXTURE | % REDUCTION |
| 100 | 14 | 9 | |
| 150 | 23 | 12 | |
| 200 | 30 | 15 | |
| 300 | 46 | 20 | |
| 400 | 60 | 23 | |
| 500 | 76 | 25 | |
| 600 | 92 | 28 | 70% |

The lubricity results of Example 2, Test 3 indicate an improvement in lubrication was about 70% at the 600 reading on the lubricity tester, which is an excellent result.

EXAMPLE 2

Test 4: Texture of Dynamic Filter Cake Surfaces

The texture of the filter cake surfaces and the surfaces of the base mud were also tested. The results were as follows: the texture of the surface of the base 16.9 ppg mud was smooth and shinny. The texture of the Dynamic Filter Cake surface of the base mud treated with 2% by volume of the talc, bead and oil mixture was shinny and the copolymer beads could be seen impregnated in the cake as well as protruding on the surface of the cake.

EXAMPLE 3

Reduction in Capillary Attractive Forces of Examples 1& 2

In Example 3, the (dynamic) filter cake of the base mud was placed on a flat surface and a piece of glass ¼ inch thick and four inches square was placed flat on the surface of the base mud filter cake and allowed to sit for thirty minutes. An attempt was then made to lift the glass from the filter cake. As the glass plate was lifted, the filter cake followed and it was as though the filter cake was glued to the glass.

The (dynamic) filter cake of the base mud to which 2% of the additive of the present invention was added was placed on the flat surface and the same process discussed above was duplicated. It was found that the piece of glass easily separated from the filter cake surface, which was treated with the additive of the present invention. The results show that the additive mixture of the present invention definitely reduced, if not, eliminated the capillary attractive forces of the wall cake.

Since the above tests were conducted in open air on the counter top, it was determined that the same tests should be conducted while totally submerged in the drilling fluid. In running the same tests with the filter cake and the 4 inch piece of glass completely submerged in the drilling fluid, it would be concluded that no air would be present in the filter cake or the glass surface and such a test would resemble a wellbore filled with drilling fluid. This test results were as follows: the glass plate stuck more firmly to the submerged water-based mud wall cakes than it did in open air; and the glass plate would not stick to the wall cakes of the water-based muds, which were treated with the 2% by volume of the drilling fluid additive of the present invention.

Talc, Graphite & Carrier:

The benefits of using fine particle graphite and fine particle uintaite in drilling fluids by adding the dry products to the drilling fluids have been minimal. Over the years, graphite and uintaite (Gilsonite™) have been used to reduce fluid loss, provide lubrication, and help prevent bit and bottom hole assembly balling. Only marginal results have been obtained by adding the dry powdered graphite and uintaite. These dry products seem to be hydrophobic by nature and do not easily mix or disperse in the water based drilling fluids. Improving the filter cake integrity of a drilling fluid is paramount in sucessfully drilling a well. Drilling fluid specialists are constantly searching for better and more effective particle-plugging agents. Most frequently used particle plugging agents would be bentonite clay, lignite, starches, cellulose, polymers, ground mud shells, etc. In water-base drilling fluids, solids are essential to the mud system. Some of these solids are called commercial solids such as lignite, barite, bentonite and other solids that are added on order to enhance the mud system. Other solids such as the formation being drilled or drilled solids are also incorporated in the drilling fluid. In water-based drilling fluids, water dilution is a necessity or the fluid becomes too thick the pump. As the solids content of the drilling fluid increases, the penetration rate of the drill bit decreases. It is therefore desirable to achieve the maximum benefit from commercial solids which are added to the drilling fluid by adding the smallest or least amount of commercial solids in order to achieve sufficient particle plugging and to insure good filter cake integrity. Dry products are added to the drilling fluid as pounds per barrel (ppb). It is an object of this invention to show that fluid loss improvement and better filter cake integrity can be achieved with less commercial solids such as dry graphite and/or uintaite being added to the drilling fluid. This improvement can be attributed to admixing the graphite and uintaite dry powders to a liquid carrier such as glycol and then admixing talc and 18–100 mesh copolymer beads in order to suspend the graphite and uintaite in the liquidy carrier. The liquid graphite and uintaite suspension is more effective while adding less overall solids to the drilling fluid. A graphite and uintaite suspension with carrier was formulated and the following tests were conducted:

120 grams of glycol and 25 grams of graphite were mixed for 10 minutes. To this mixture, 25 grams of uintaite was added and mixed for 10 minutes. To this mixture, 10 grams of talc and 10 grams of polymer beads was added and mixed at high speed until the mixture became extremely hot to the touch, about 125–140 degree F. or for about 20–45 minutes. The viscosity of the mixture thickens initially as all of the solids are added to the carrier but as the temperature increases to 110–135 degree F. the viscosity thins down. As this point 10 grams of water is added and mixed for about 10 minutes. The sample is then allowed to cool to room temperature and is now ready to be compared to the dry products.

EXAMPLE 4

Test 1: Comparison of Dry Graphite to Liquid Graphite Mixture

The addition of 2% of the graphite dispersion is equivalent to approximately 2 ppb of graphite as compared to 8 ppb of dry graphite. The 2 ppb of graphite in the liquid carrier clearly outperforms the 8 ppb of dry graphite.

The particle sizes of the graphite and uintaite should be such that 100% would pass through a 200 mesh shaker screen and at least 50% would pass through a 300 mesh shaker screen. The results of Example 4, Test 1 are set forth below in Table 8:

TABLE 8

HPHT & Cake Wt. Comparison

|  | BASE MUD | BASE MUD & 8 ppb DRY GRAPHITE | BASE MUD & 2% GRAPHITE DISPERSION |
|---|---|---|---|
| Density | 17.3 | 17.3 | 17.3 |
| pH Meter | 11.5 | 11.5 | 11.5 |
| 600 rpm | 82 | 111 | 85 |
| 300 rpm | 46 | 66 | 49 |
| 200 rpm | 34 | 49 | 44 |
| 100 rpm | 20 | 31 | 29 |
| 6 rpm | 3 | 5 | 6 |
| 3 rpm | 2 | 4 | 5 |
| PV @ 120 F. | 36 | 45 | 36 |
| YP | 10 | 21 | 13 |
| Gels 10 s/10 m/30 m | 3/6/7 | 5/17/22 | 3/7/8 |
| HPHT @ 300 Deg. F./ml. | 8.4 | 7.8 | 5.6 |
| Cake Wt./g. | 19 | 20 | 12.8 |
| Cake Thickness (Inch.) | 4/32 | 4/32 | 3/32 |

The results of Example 4, Test 1 indicate the following: the 2% graphite dispersion showed better results than the 8 ppb dry graphite. The HPHT fluid loss was reduced from 7.8 to 5.6; a 28% reduction, which is excellent. The cake in weight in grams was reduced from 20 grams to 12.8 grams, a 36% reduction, which is also excellent. The cake thickness in inches was also reduced from 4/32 to 3/32.

EXAMPLE 4

Test 2: Dynamic Filtration

In Example 4, Test 2, the following dynamic filtration criteria were tested: (a) Fluid loss versus time; (b) Filter cake wt/gram; and (c) Filter cake thickness in inches. The dynamic filtration data of Example 4, Test 2 is set forth in Table 9 below:

TABLE 9

DYNAMIC FILTRATION
10 Darcy, 35 Micron Filter Media
300 Degrees F., 600 rpm @ 1000 PSI for 60 Minutes

| Time/Minutes | BASE MUD | BASE MUD & 8 ppb DRY GRAPHITE Fluid Loss/ml | BASE MUD & 2% GRAPHITE DISPERSION |
|---|---|---|---|
| Initial Spurt | Trace | 0.0 | 0.0 |
| 15 | 7.0 | 3.6 | 1.0 |
| 30 | 10.8 | 8.8 | 2.8 |
| 45 | 13.8 | 11.4 | 4.6 |
| 60 | 16.0 | 13.6 | 8.2 |
| Cake Wt. (g.) | 44 | 38 | 28 |
| Cake Thickness (Inch) | 8/32 | 7/32 | 5/32 |

The results of Example 4, Test 2, Table 9 are as follows: after 60 minutes, the dynamic fluid loss was reduced from 13.6 ml to 8.2 ml, a 40% reduction, which is an excellent result. The cake weight in grams was reduced from 38 grams to 28 grams, a 26% reduction, which is a very good result. The filter cake was reduced from 7/32 to 5/32, which is also a very good result.

EXAMPLE 4

Test 3: Lubricity Test

Table 10 below shows the test results of the lubricity of the additive as torque is applied.

TABLE 10

LUBRICITY TEST @ 60 rpms
Co-efficient of Friction of Water (0.33–0.36) = 0.33; i.e.
reading at 150 inch pounds is 33

Lubricity Meter Reading
(electrical current required to sustain 60 rpm at applied torque)

| Applied Torque/<br>Inch Pounds | BASE<br>MUD | BASE MUD &<br>8 ppb DRY<br>GRAPHITE | BASE MUD &<br>2% GRAPHITE<br>DISPERSION |
|---|---|---|---|
| 100 | 11 | 11 | 8 |
| 150 | 17 | 16 | 12 |
| 200 | 23 | 22 | 21 |
| 300 | 34 | 32 | 28 |
| 400 | 44 | 41 | 37 |
| 500 | 57 | 51 | 41 |
| 600 | 66 | 60 | 52 |

The lubricity results of Example 4, Test 3 indicate an improvement in lubrication was about 13% at the 600 reading on the lubricity tester, which is a very good result.

EXAMPLE 5

Test 1: Comparison of Dry Graphite to Liquid Graphite Mixture in a Lighter Weight Mud The addition of 2% of the graphite dispersion is equivalent to approximately 2 ppb of graphite as compared to 8 ppb of dry graphite in a lighter weight mud. The 2 ppb of graphite in the liquid carrier clearly outperforms the 8 ppb of dry graphite in the lighter weight mud.

The particle sizes of the graphite and uintaite should be such that 100% would pass through a 200 mesh shaker screen and at least 50% would pass through a 300 mesh shaker screen. The results of Example 5, Test 1 are set forth below in Table 11:

TABLE 11

HPHT & Cake Wt. Comparison

| | BASE<br>MUD | BASE MUD &<br>8 ppb DRY<br>GRAPHITE | BASE MUD &<br>2% GRAPHITE<br>DISPERSION |
|---|---|---|---|
| Density | 10.7 | 10.7 | 10.7 |
| pH Meter | 10.5 | 10.5 | 10.5 |
| 600 rpm | 30 | 34 | 35 |
| 300 rpm | 18 | 20 | 22 |
| 200 rpm | 13 | 14 | 17 |
| 100 rpm | 9 | 9 | 11 |
| 6 rpm | 3 | 2 | 4 |
| 3 rpm | 2 | 2 | 3 |
| PV @ 120 F. | 12 | 14 | 13 |
| YP | 6 | 6 | 9 |
| Gels 10 s/10 m/30 m | 5/28 | 5/26 | 7/26 |
| HPHT @ 200 Deg. F./ml. | 15.4 | 12.2 | 9.2 |
| Cake Wt. (g.) | 14.0 | 13.0 | 10.5 |
| Cake Thickness (Inch) | 4/32 | 4/32 | 3/32 |

The results of Example 5, Test 1 indicate the following: the 2% graphite dispersion showed better results than the 8 ppb dry graphite in the lighter weight mud. The HPHT fluid loss was reduced from 12.2 to 9.2; a 25% reduction, which is excellent. The cake in weight in grams was reduced from 13 grams to 10.5 grams, a 19% reduction, which is also excellent. The cake thickness in inches was also reduced from 4/32 to 3/32.

EXAMPLE 5

Test 2: Dynamic Filtration

In Example 5, Test 2, the following dynamic filtration criteria were tested: (a) Fluid loss versus time; (b) Filter cake wt/gram; and (c) Filter cake thickness in inches. The dynamic filtration data of Example 5, Test 2 is set forth in Table 12 below:

TABLE 12

DYNAMIC FILTRATION
10 Darcy, 35 Micron Filter Media
300 Degrees F., 600 rpm@ 1000 PSI for 60 Minutes

| TIME/Minutes | BASE<br>MUD | BASE MUD & 8 ppb<br>DRY GRAPHITE<br>Fluid Loss/ml. | BASE MUD &<br>2% GRAPHITE<br>DISPERSION |
|---|---|---|---|
| Initial Spurt | Trace | Trace | Trace |
| 15 | 10.2 | 8.8 | 6.8 |
| 30 | 16.0 | 12.8 | 9.8 |
| 45 | 20.4 | 16.6 | 12.4 |
| 60 | 25.6 | 19.8 | 14.2 |
| Cake Wt. (g.) | 17.5 | 15.0 | 11.7 |
| Cake Thickness (Inch) | 5/32 | 4/32 | 3/32 |

The results of Example 5, Test 2, Table 12 are as follows: after 60 minutes, the dynamic fluid loss was reduced from 19.8 ml to 14.2 ml, a 28% reduction, which is an excellent result. The cake weight in grams was reduced from 15 grams to 11.7 grams, a 22% reduction, which is a very good result. The filter cake was reduced from 4/32 to 3/32, which is also a very good result.

EXAMPLE 5

Test 3: Lubricity Test

Table 13 below shows the test results of the lubricity of the additive as torque is applied.

TABLE 13

LUBRICITY TEST @ 60 rpms
Co-efficient of Friction of Water (0.33–0.36) = 0.33; i.e.
reading at 150 inch pounds is 33

Lubricity Meter Reading
(electrical current required to sustain 60 rpm at applied torque)

| Applied Torque/<br>Inch Pounds | BASE<br>MUD | BASE MUD &<br>8 ppb<br>DRY GRAPHITE | BASE MUD &<br>2% GRAPHITE<br>DISPERSION |
|---|---|---|---|
| 100 | 12 | 11 | 10 |
| 150 | 18 | 17 | 15 |
| 200 | 22 | 20 | 18 |
| 300 | 33 | 30 | 26 |
| 400 | 47 | 41 | 31 |

TABLE 13-continued

LUBRICITY TEST @ 60 rpms
Co-efficient of Friction of Water (0.33–0.36) = 0.33; i.e.
reading at 150 inch pounds is 33

Lubricity Meter Reading
(electrical current required to sustain 60 rpm at applied torque)

| Applied Torque/<br>Inch Pounds | BASE<br>MUD | BASE MUD &<br>8 ppb<br>DRY GRAPHITE | BASE MUD &<br>2% GRAPHITE<br>DISPERSION |
|---|---|---|---|
| 500 | 60 | 52 | 41 |
| 600 | 80 | 65 | 50 |

The lubricity results of Example 5, Test 3 indicate an improvement in lubrication was about 23% at the 600 reading on the lubricity tester, which is an excellent result.

EXAMPLE 6

Test 1: Comparison of Dry Graphite/Dry Uintaite to Liquid Graphite/Uintaite Mixture The addition of 2% of the graphite/uintaite dispersion is equivalent to approximately 2 ppb of graphite/uintaite as compared to 4 ppb of dry graphite and 4 ppb graph of dry uintaite. The 2% graphite/uintaite dispersion clearly outperforms the 4 ppb of dry ite and 4 ppb of dry uintaite.

The particle sizes of the graphite and uintaite should be such that 100% would pass through a 200 mesh shaker screen and at least 50% would pass through a 300 mesh shaker screen. The results of Example 5, Test 1 are set forth below in Table 14:

TABLE 14

HPHT & Cake Wt. Comparison

| | BASE MUD | BASE MUD &<br>4 ppb DRY<br>GRAPHITE & 4 ppb<br>DRY UINTAITE | BASE MUD &<br>2% GRAPHITE/<br>UINTAITE<br>DISPERSION |
|---|---|---|---|
| Density | 16.2 | 16.2 | 16.2 |
| pH Meter | 11.5 | 11.5 | 11.5 |
| 600 rpm | 91 | 100 | 102 |
| 300 rpm | 54 | 60 | 58 |
| 200 rpm | 40 | 44 | 43 |
| 100 rpm | 26 | 28 | 29 |
| 6 rpm | 7 | 8 | 7 |
| 3 rpm | 6 | 7 | 5 |
| PV @ 120 F. | 37 | 40 | 44 |
| YP | 17 | 20 | 14 |
| Gels 10 s/<br>10 m/30 m | 7/23 | 7/35 | 7/30 |
| HPHT @<br>300 Deg. F./<br>ml. | 25 | 18.2 | 13.4 |
| Cake Wt. (g.) | 34 | 29 | 21 |
| Cake<br>Thickness<br>(Inch) | 7/32 | 5/32 | 4/32 |

The results of Example 6, Test 1 indicate the following: the 2% graphite/uintaite dispersion showed better results than the 4 ppb dry graphite and 4 ppb dry uintaite. The HPHT fluid loss was reduced from 18.2 to 13.4; a 26% reduction, which is excellent. The cake in weight in grams was reduced from 29 grams to 21 grams, a 28% reduction, which is also excellent. The cake thickness in inches was also reduced from 5/32 to 4/32, a 20% reduction, which is also an excellent result.

EXAMPLE 6

Test 2: Dynamic Filtration

In Example 6, Test 2, the following dynamic filtration criteria were tested: (a) Fluid loss versus time; (b) Filter cake wt/gram; and (c) Filter cake thickness in inches. The dynamic filtration data of Example 6, Test 2 is set forth in Table 15 below:

TABLE 15

DYNAMIC FILTRATION
10 Darcy, 35 Micron Filter Media
300 Degrees F., 600 rpm@ 1000 PSI for 60 Minutes

| TIME/Minutes | BASE<br>MUD | BASE MUD &<br>4 ppb DRY<br>GRAPHITE & 4 ppb<br>DRY UINTAITE | BASE MUD &<br>2% GRAPHITE/<br>UINTAITE<br>DISPERSION |
|---|---|---|---|
| | | Fluid Loss/ml. | |
| Initial Spurt | Trace | Trace | Trace |
| 15 | 17.4 | 15.2 | 12.0 |
| 30 | 27.6 | 24.0 | 18.2 |
| 45 | 35.6 | 30.8 | 23.0 |
| 60 | 42.4 | 36.4 | 26.2 |
| Cake Wt./g. | 69 | 57 | 41 |
| Cake Thickness/<br>Inch. | 14/32 | 11/32 | 8/32 |

The results of Example 6, Test 2, Table 15 are as follows: after 60 minutes, the dynamic fluid loss was reduced from 36.4 ml to 26.2 ml, a 28% reduction, which is an excellent result. The cake weight in grams was reduced from 57 grams to 41 grams, a 28% reduction, which is an excellent result. The filter cake was reduced from 11/32 to 8/32, which is also an excellent result.

EXAMPLE 6

Test 3: Lubricity Test

Table 16 below shows the test results of the lubricity of the additive as torque is applied.

TABLE 16

LUBRICITY TEST @ 60 rpms/
Co-efficient of Friction of Water (0.33–0.36) = 0.33;
i.e. reading at 150 inch pounds is 33

Lubricity Meter Reading (electrical current required to sustain 60 rpm at applied torque)

| Applied Torque/<br>Inch Pounds | BASE<br>MUD | BASE MUD &<br>4 ppb DRY<br>GRAPHITE &<br>4 ppb DRY UINTAITE | BASE MUD &<br>2% GRAPHITE/<br>UINTAITE<br>DISPERSION |
|---|---|---|---|
| 100 | 8 | 7 | 6 |
| 150 | 12 | 10 | 9 |
| 200 | 17 | 14 | 13 |
| 300 | 28 | 24 | 21 |
| 400 | 36 | 32 | 25 |
| 500 | 44 | 38 | 30 |
| 600 | 64 | 49 | 37 |

The lubricity results of Example 6, Test 3 indicate an improvement in lubrication was about 25% at the 600 reading on the lubricity tester, which is an excellent result.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A drilling fluid additive system comprising:
 a drilling fluid additive comprising talc, graphite, copolymer beads and at least one carrier, said carrier is selected from a group consisting of oils, esters, glycols, cellulose, olefins and mixtures thereof; and hydrophilic clay, a pH controller, a fluid loss controller, and at least one dispersant.

2. The drilling fluid additive system of claim 1 wherein said drilling fluid additive further comprises uintaite.

3. The drilling fluid additive system of claim 1 wherein said carrier comprises polypropylene glycol.

4. The drilling fluid additive system of claim 2 wherein said talc comprises from about 1% to about 20% of said additive, said graphite comprises from about 1% to about 30% of said additive, said carrier comprises from about 50% to about 90% of said additive and said uintaite comprises from about 1% to about 40% of said additive.

5. The drilling fluid additive system of claim 1 wherein said carrier is selected from a group consisting of polypropylene glycol, polyethoxylated glycol, polybutylene glycol, polyethylene glycol, propylene glycol, polyester polyol-poly (oxyethylene-oxy) propylene glycol, polyoxyalkylene glycol ethers and mixtures thereof.

6. The drilling fluid additive system of claim 2 wherein said uintiate is treated with a second carrier, said second carrier consists essentially of oils, esters, glycols, cellulose, olefins and mixtures thereof.

7. The drilling fluid additive system of claim 1 further comprises a weighting agent, said weighting agent is selected from a group consisting of barium sulfate, calcium carbonate, hematite, and salts.

8. The drilling fluid additive system of claim 1 wherein said pH controller is selected from a group consisting of caustic soda, potassium hydroxide, lime and sodium hydroxide.

9. The drilling fluid additive system of claim 1 wherein said fluid loss controller is selected from a group consisting of lignites, polyacrylamide and graphite uintaite glycol dispersions.

10. The drilling fluid additive system of claim 1 wherein said hydrophilic clay is selected from a group consisting of bentonite and kaolin clay.

11. The drilling fluid additive system of claim 1 wherein said dispersant is selected from a group consisting of lignite, lignosulfonate and tannin.

12. The drilling fluid additive system of claim 1 further comprises a chemical inhibitor, said chemical inhibitor is selected from a group consisting of gypsum, lime, potassium chloride, potassium hydroxide, magnesium sulfate and calcium sulfate.

13. A drilling fluid additive system manufactured by a method comprising: admixing talc, graphite, copolymer beads and at least one carrier to form a drilling fluid additive mixture, said carrier is selected from a group consisting of oils, esters, glycols, cellulose, olefins and mixtures thereof; and further admixing hydrophilic clay, a pH controller, a fluid loss controller, and at least one dispersant to said drilling fluid additive mixture.

14. The drilling fluid additive system of claim 13 wherein said carrier is first admixed with said talc and then the graphite is admixed to form said drilling fluid additive mixture.

15. The drilling fluid additive system of claim 13 further comprises admixing an uintaite with said drilling fluid additive mixture.

16. The drilling fluid additive system of claim 15 wherein said uintaite is pre-treated with a second carrier prior to said uintaite being admixed to said drilling fluid additive mixture.

17. The drilling fluid additive system of claim 15 wherein said talc comprises from about 1% to about 20% of said additive, said graphite comprises from about 1% to about 30% of said additive, said carrier comprises from about 50% to about 90% of said additive and said uintaite comprises from about 1% to about 40% of said additive.

18. The drilling fluid additive system of claim 16 wherein said second carrier is selected from a group consisting of oils, esters, glycols, cellulose, olefins, ethoxylated surfactants and mixtures thereof.

19. The drilling fluid additive system of claim 13 further comprises admixing a weighting agent, said weighting agent is selected from a group consisting of barium sulfate, calcium carbonate, hematite, and salts.

20. The drilling fluid additive system of claim 13 further comprises admixing a chemical inhibitor, said chemical inhibitor is selected from a group consisting of gypsum, lime, potassium chloride, potassium hydroxide, magnesium sulfate and calcium sulfate.

21. The drilling fluid additive system of claim 13 wherein said pH controller is selected from a group consisting of caustic soda, potassium hydroxide, lime and sodium hydroxide.

22. The drilling fluid additive system of claim 13 wherein said fluid loss controller is selected from a group consisting of lignites, polyacrylamide and graphite uintaite glycol dispersions.

23. The drilling fluid additive system of claim 13 wherein said hydrophilic clay is selected from a group consisting of bentonite and kaolin clay.

24. The drilling fluid additive system of claim 13 wherein said dispersant is selected from a group consisting of lignite, lignosulfonate and tannin.

25. A method of manufacturing a drilling fluid additive system, said method comprising:
 admixing talc with at least one carrier, said carrier is selected from a group consisting of oils, esters, glycols, cellulose, olefins and mixtures thereof;
 admixing graphite and copolymer beads to the talc/carrier mixture to thereby form a drilling fluid additive mixture; and
 further admixing hydrophilic clay, a pH controller, a fluid loss controller, and at least one dispersant to said drilling fluid additive mixture.

26. The method of claim 25 further comprising admixing an uintaite with said drilling fluid additive mixture.

27. The method of claim 26 wherein said uintaite is pretreated with a second carrier prior to admixing said uintaite to said drilling fluid additive mixture.

28. The method of claim 27 wherein said second carrier is selected from a group consisting of oils, esters, glycols, cellulose, olefins and mixtures thereof.

29. The method of claim 25 further comprises admixing a weighting agent, said weighting agent is selected from a group consisting of barium sulfate, calcium carbonate, hematite, and salts.

30. The method of claim 25 further comprises admixing a chemical inhibitor, said chemical inhibitor is selected from a group consisting of gypsum, lime, potassium chloride, potassium hydroxide, magnesium sullfate and calcium sulfate.

31. The method of claim 25 wherein said pH controller is selected from a group consisting of caustic acid, potassium hydroxide, lime and sodium hydroxide.

32. The method of claim 25 wherein said fluid loss controller is selected from a group consisting of lignites, polyacrylamide and graphite uintaite glycol dispersions.

33. The method of claim 25 wherein said hydrophilic clay is selected from a group consisting of bentonite and kaolin clay.

34. The method of claim 25 wherein said dispersant is selected from a group consisting of lignite, lignosulfonate and tannin.

* * * * *